US007616772B2

(12) United States Patent
Sabick et al.

(10) Patent No.: US 7,616,772 B2
(45) Date of Patent: Nov. 10, 2009

(54) EARPHONE FOR SOUND REPRODUCTION

(75) Inventors: Gary Lester Sabick, Schaumburg, IL (US); Scott A. Snyder, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 709 days.

(21) Appl. No.: 11/268,873

(22) Filed: Nov. 8, 2005

(65) Prior Publication Data

US 2006/0098836 A1 May 11, 2006

Related U.S. Application Data

(60) Provisional application No. 60/626,219, filed on Nov. 9, 2004.

(51) Int. Cl.
*H04R 25/00* (2006.01)

(52) U.S. Cl. ........................ 381/374; 381/370; 381/380

(58) Field of Classification Search ................. 381/324, 381/325, 327–328, 370–371, 380–381, 374
See application file for complete search history.

(56) References Cited

U.S. PATENT DOCUMENTS

| | | | | |
|---|---|---|---|---|
| 5,712,918 | A * | 1/1998 | Yoest | 381/328 |
| 6,009,183 | A | 12/1999 | Taenzer et al. | |
| 6,084,976 | A | 7/2000 | Lin | |
| 6,411,722 | B1 | 6/2002 | Wolf | |

OTHER PUBLICATIONS

PCT International Search Report mailed Oct. 31, 2006, 12 pages.

* cited by examiner

*Primary Examiner*—Suhan Ni
(74) *Attorney, Agent, or Firm*—Banner & Witcoff, Ltd.

(57) ABSTRACT

In an aspect of the invention, a sealed earphone is provided with a nozzle, the earphone configured to be positioned in a user's ear so that the nozzle extends toward the ear canal of the user. The earphone includes a driver mounted within a housing of the earphone, the driver including a sound port acoustically sealed to the nozzle. In an embodiment, the driver may include an acoustic port that directs sound into an acoustic enclosure so as to modify the frequency response of the earphone. The earphone may include a fastener that removably mounts the nozzle to the housing so that the nozzle may be readily removed and cleaned or replaced.

8 Claims, 15 Drawing Sheets

EARPHONE FOR SOUND REPRODUCTION

This application claims priority to provisional Application Ser. No. 60/626,219 filed Nov. 9, 2004, which is incorporated by reference in its entirety herein.

BACKGROUND OF THE INVENTION

1. Field of the Invention

The present invention relates to the field of sound reproduction, more specifically to the field of sound reproduction using an earphone.

2. Description of Related Art

The use of headphones for sound reproduction is known. Typically, high fidelity headphones are large, bulky devices that have a first speaker enclosure, a second speaker enclosure, and a "C" shaped band that connects the two speaker enclosures and holds the enclosures against the user's ears. While functional, these devices tend to be heavy and uncomfortable and, if the user is moving in a vigorous manner, overly warm on the users ears. Furthermore, traveling with these devices can be difficult due to the size of the headphones and the space it takes to store them.

As the speaker enclosures are held against the individual's ears, and as an ear is not typically a smooth surface against which the enclosures can readily be sealed, headphones suffer from unwanted exterior sound interfering with the listener's ability to enjoy the reproduction of sound. Attempts to solve this problem have used compressible sealing elements to improve the seal between the user's ears and the enclosure or to use active noise cancellation techniques to cancel out exterior noise.

To reduce the bulkiness and weight, in-the-ear speakers or earphones have been designed to replace headphones. The advantage of earphones over headphones includes a substantial reduction in size and weight, less trapping of the user's heat, and the potential for a significant reduction in unwanted external noise without the need for active noise reduction as is found on some headphone models.

Earphones, however, have certain design challenges. The small space available requires the use of smaller drivers and careful internal acoustic sealing to ensure the sound is directed to the user's ear. In addition, the exterior of the earphone must also be suitable for sealing the exterior of the earphone to the user's ear if the desired sound isolation is to be provided. Furthermore, the small size of the driver makes the production of lower frequencies more difficult. One method of providing a full range of sound reproduction, such as is used in the Shure® E5c earphone, is to use a smaller and a larger driver in combination. While such a design is well suited to reproducing sound with a high degree of fidelity, using two drivers tends to make an earphone somewhat larger in size and more costly to produce. Thus, it would be desirable to provide an earphone that can provide a desired range of frequency response without the need to use two drivers so that the cost of manufacturing the earphone can be reduced.

In addition, as earphones typically have a nozzle that is inserted into the user's ear, the accumulation of cerumen or earwax can be a problem. This problem could be particularly acute if the user is, for example, a performer using the earphones as a monitor with a Shure® PSM 600 in a wireless mode. The lack of wires allows the performer to move about in a more spontaneous and vigorous manner. Thus, the performer is not limited to performing in front of a traditional monitor and this gives the performer greater freedom to move. However, vigorous movement of a performer can generate body heat and body heat can cause the wax in the performer's ear to liquefy such that it will enter the earphone nozzle. The liquefied earwax can thus leave deposits on a filter inside the nozzle. Over time, these deposits can prevent the earphones from working as intended, either by reducing the sound output levels or by changing the tonal quality of the sound being produced, or both. It would be desirable to provide a way for the user to readily resolve this issue without complicated or difficult disassembly and reassembly of the earphone.

Another issue is that different individuals have different preferences regarding how bright or warm the music should be when reproduced. Some of the variance can be accounted for by the individual variance in hearing. However, some portion of the difference rests with the individuals' perception of what the reproduced sound should sound like and/or the type of music typically being reproduced for the individual. Thus, it is recognized that some individuals prefer a warmer sound and some individuals prefer a brighter sound. It would be desirable to provide a means for allowing a user to readily customize an earphone so that the sound reproduction fit the user's musical tastes and hearing ability.

It should be noted that, as is known, brightness and warmth generally refers to the perception of reproduced sound, with brightness being related to higher frequencies such as the band between about 4 and 10 kHz and warmth being related to lower frequencies such as the band between about 150 and 500 Hz. Thus, as used herein, the brightness or warmth of reproduced sound corresponds to the amplification or attenuation of different portions of the frequency response.

BRIEF SUMMARY OF THE INVENTION

In an embodiment, an earphone includes a nozzle with a desired orientation mounted to the housing of the earphone. The nozzle is held in place by a threaded nut that may be removed by hand. The nozzle includes a locating pin that matches with a detent in the earphone so that the nozzle can only be installed in the desired orientation. Thus, the nozzle can readily be removed and replaced when sound production becomes affected by the build up of wax deposits.

In an embodiment, an earphone includes a driver that has a sound port for projecting into the user's ear. The driver further includes an aperture that allows the internal volume of the earphone to act as a sealed enclosure so as to enhance the production of lower frequencies. In this manner, a smaller driver can be utilized that can accurately produce the middle and upper range frequencies while still producing lower range frequencies at a level that would otherwise be difficult to provide with a driver of that size.

In an embodiment, an earphone includes a nozzle with a filter situated inside the nozzle. The filter protects the internal components of the earphone and can also alter the acoustic properties of the reproduced sound. By varying the properties of the filter, the reproduced sound enjoyed by the user can be varied from a brighter sound to a warmer sound. Thus, the performance of the earphone can be customized by the user according to the user's ability to hear and also according to the user's musical preference.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Earphones have been used for some time by individuals who prefer the light weight and ease of carrying earphones over headphones. As is true in all areas of sound reproduction, some earphones provide less than desirable fidelity and also do little to block external sound. While these earphones may be suitable for individuals who are less serious about music reproduction, such earphones are undesirable for individuals with more discriminating musical tastes or needs. Furthermore, performers who utilize earphones as a monitor replacement require a higher degree of performance. Thus, embodiments of the present invention are directed toward an earphone that can satisfy the requirements of both professional performers and individuals with higher expectations or needs regarding the fidelity of musical reproduction.

Figure 1:
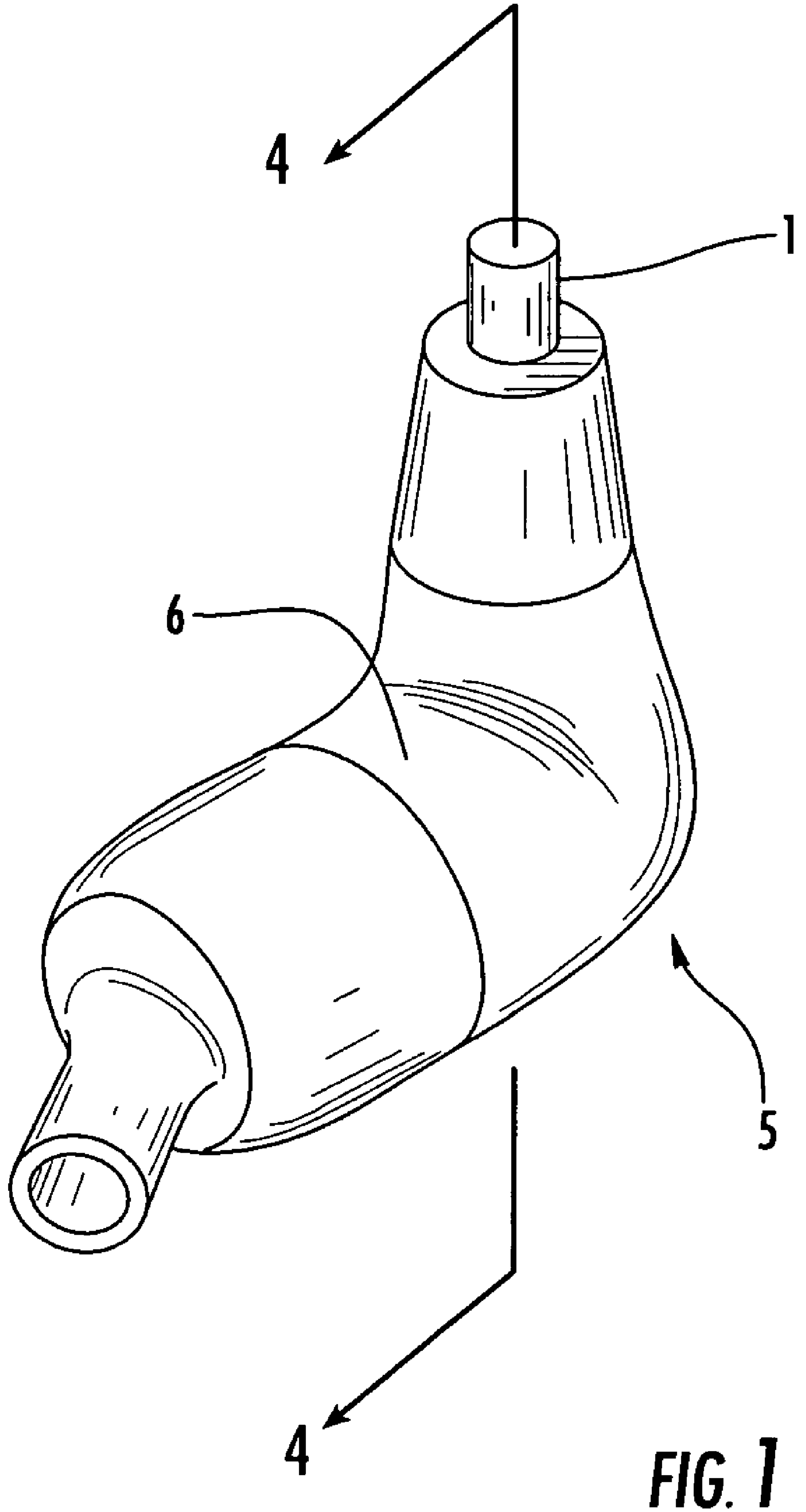
FIG. 1 depicts an illustration of an embodiment of an earphone in accordance with an aspect of the present invention.

Turning now to FIG. 1, as depicted a wire 1 is connected to an earphone 5 that includes a housing 6. As depicted, earphone 5 is configured to be used in an individual's right ear. In an embodiment, earphone 5 can be configured for use in either the right or the left ear by changing the orientation of components of the earphone in a manner that will be discussed below.

Figure 2:
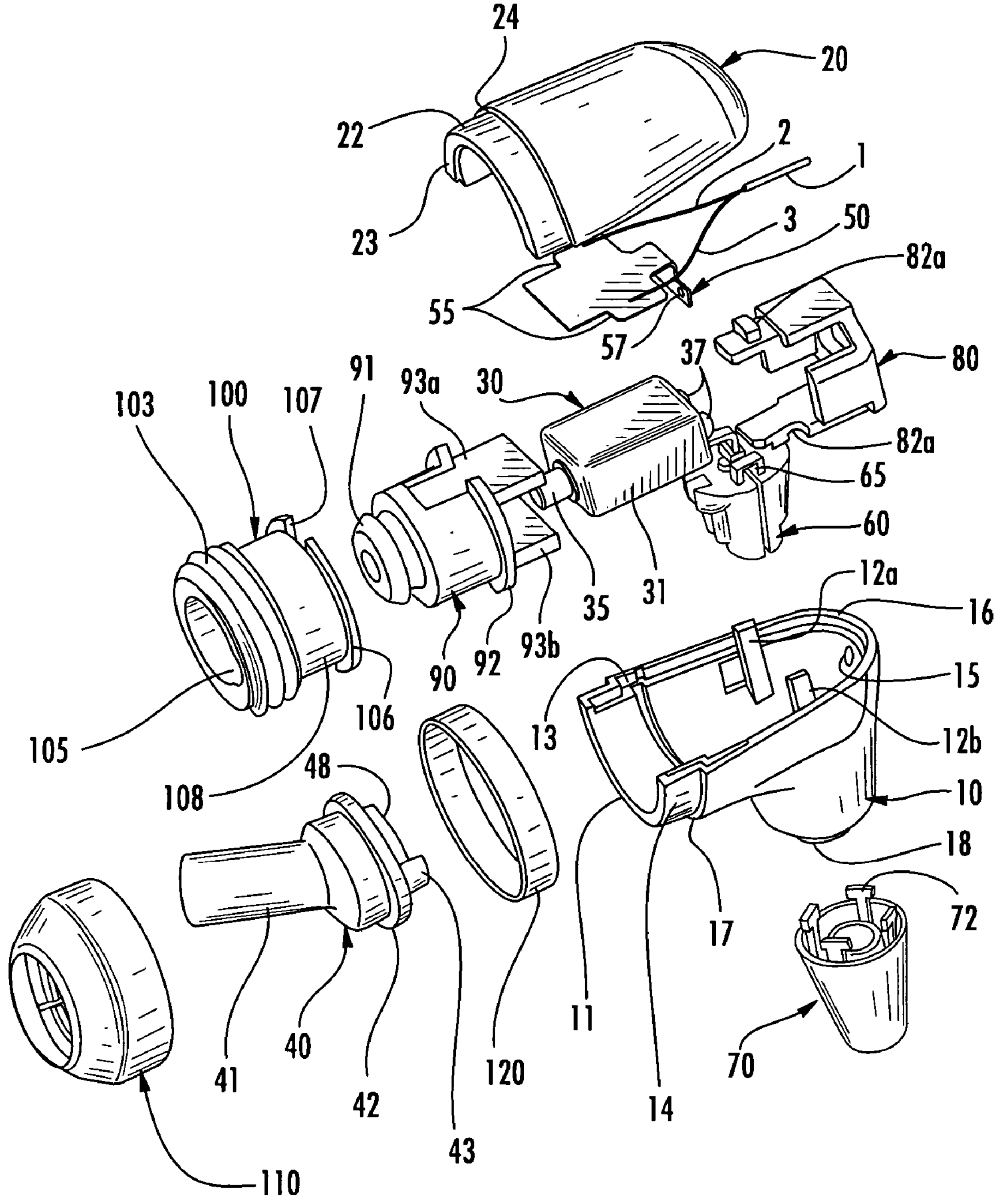
FIG. 2 depicts an exploded elevated view of an embodiment of an earphone in accordance with an aspect of the present invention.

Turning now to FIG. 2, the earphone 5 of FIG. 1 is illustrated in an exploded elevated view. A portion of the wire 1 is shown, with conductors 2 and 3 extending from the wire 1. In operation the wire 1 must extend to a power source (not shown) that can generate a signal in order for the earphone 5 to reproduce sound.

As depicted, the housing 6 of the earphone 5 includes a case 10 that is configured to mate with a cover 20 so as to provide an enclosure for the earphone 5. In an embodiment, the case 10 and the cover 20 may be made of an ABS plastic or other suitable material that is preferably plastic. The case 10 includes a perimeter shoulder 16 that is depicted as being provided around substantially most of mating surface of the case 10. The cover 20 includes a corresponding shoulder 21 (FIG. 3) that mates with the shoulder 16 in a manner that will be discussed further with regards to FIG. 4.

As depicted, the case 10 includes a step 17 that extends around a portion of the exterior of the case 10, the case 10 further including a friction edge 11. Between the friction edge 11 and the step 17 is a ring surface 14. A channel 13 is also provided on the interior side of the case 10. In addition, post 12*a* and post 12*b* are provided. Case 10 further includes a notch 15. A portion of a pocket 18 is visible in FIG. 2. The use of these features will be discussed in greater detail below.

As depicted, the cover 20 includes a ring surface 22, a friction edge 23 and a step 24 that corresponds to the features provided in the case 10. As noted above, the cover 20 is configured to sealably mate with the case 10 so as to provide a sealed chamber surrounding the components of the earphone 5. In an embodiment, the exterior of cover 20 may include a rubberized coating so that the earphone 5 has a desirable feel.

Mounted inside the enclosure formed by the joining of the case 10 and the cover 20 is a driver 30. The use and design of drivers are known and the driver 30 can be, for example, a Knowles model # ED-6805. The driver 30 has a driver body 31 and includes a sound port 35 that extends from the driver body 31. As depicted, the driver body 31 includes two solder pads 37 on the backside of the driver body 31. Other drivers may be configured differently. An opening or acoustic port 38 (FIG. 15) may also be provided. In an embodiment, the location of the acoustic port 38 is between the two solder pads 37. Other drivers may also be used and a different position for the acoustic port, if used, may be provided.

In a manner that will be discussed below in further detail, sound emitting from the driver 30 is directed through the sound port 35 into the nozzle 40. Sounds exit the nozzle 40 by passing through the cylinder 41. To ensure that the nozzle 40 is installed in the correct orientation with respect to the case 10 and the cover 20, the nozzle 40 may be held in place by a lip 42 and oriented by a pin 43. The pin 43, which is an example of an orientation feature, is shown as being cylindrical but may be provided in a variety of other shapes. The nozzle 40 may further include a sealing surface 48. If the nozzle 40 is rotated 180 degrees and then installed (assuming the feature that interfaces with pin 43 was also rotated), the earphone 5 would than be configured for use in the left ear.

As noted above, the driver 30, in operation, requires a signal and power to produce sound. To provide the power and signal to the driver 30, conductors 2 and 3 may be connected to the back of driver 30 at the two solder pads 37. As the driver 30 is relatively small, soldering conductors directly to the solder pads 37 can be an unnecessarily complex manufacturing procedure. Therefore, a flex circuit 50 can be used to improve the manufacturing process. The flex circuit 50, which can be made of flexible printed circuit board, may include two wings 55. The conductor 2 and 3 can be fastened to each wing 55 in a known manner, such as via soldering, so that an electrical circuit between the signal generator (not shown) and the driver 30 can be formed. The flex circuit 50 may be electrically connected to the driver 30 by soldering the flex circuit solder points 57 to the solder pads 37. Thus, the conductors 2 and 3 may be electrically connected to the back of the driver 30 via the flex circuit 50. In other words, the flex circuit 50 provides an electrical connection between the conductors 2 and 3 and the driver 30, that while not necessary, may improve the manufacturability of the earphone 5.

The conductors 2 and 3 that are attached to the flex circuit 50 are configured to form a single strand of wire 1. The wire 1 passes through strain relief 60, through the case 10 and through flex relief 70. As is to be expected, the wire 1, which may be a two conductor cable with an outer diameter of 0.070 inches, occasionally will have a force exerted on it by the user. While expected, the force is unwanted because the force could potentially break the electrical connection between the conductors 2, 3 and the driver 30 or potentially damage the driver 30. Thus, it is useful to provide some mechanism that can protect the electrical connection and the driver 30 from forces exerted on the wire 1. The strain relief 60 prevents forces exerted on the wire from breaking the electrical connection between the conductor and the driver 30. Strain relief 60, which is depicted as including two living hinges 65, will be discussed in greater detail below.

The flex relief 70, which may be made of a suitable soft plastic or rubber material, flexes when a force is exerted on the wire 1 that is not in line with the passageway provided in the flex relief 70. In an embodiment, the flex relief 70 is over-molded onto case 10. The molding process causes the molten material to be inserted into the pockets 18 provided in the case 10 so that the fingers 72 are formed (the pocket 18 will be discussed further with respect to FIG. 3). Once the flex relief 70 cools, the fingers 72 harden and prevent the flex relief 70 from being removed from the case 10. This method of fastening the flex relief 70 to the case 10 thus has the benefit of eliminating a fastener or the need for an adhesive. Naturally, the overall design of flex relief 70 is somewhat dependent on the material chosen because a less compliant material requires a more flexible structure and a more compliant material will require a less flexible structure. As the use of a flex relief for a wire is known in the art, no further discussion of materials and structure is necessary.

Although the strain relief 60 and the flex relief 70 prevent forces exerted on the wire 1 from affecting the electrical connection of the conductors 2, 3 to the driver 30, the driver 30 must still be supported in the enclosure provided by the case 10 and the cover 20. While other methods are possible, a support 80 is provided to hold the driver in the desired position. The support 80 is preferably made of a suitably strong plastic such as ABS plastic and may also be a high temperature plastic such as GE Noryl GTX810 to aid in manufacturing. As depicted, the support 80 includes arms **82*a* and 82*b* that are configured to hold the driver 30** in position when the components are installed.

To absorb forces that might be exerted on the driver 30 if the earphone 5 is, for example, dropped, a vibration isolator may be provided and a boot 90 is an embodiment of such a vibration isolator. As depicted, the boot 90 includes wings **93*a* and 93*b* that are configured to extend along the top and bottom of the driver 30. The boot 93 is made of a pliable material such as silicone and the wings 93*a*, 93*b* are positioned between the support 80 and the driver 30 so that the boot 90 can absorb vibrations and protect the driver 30. Thus, as depicted, the arms 82*a* and 82*b* are installed over the wings 93*a* and 93*b* so that the arms 82*a* and 82*b* support the driver 30** in a cushioned manner.

The boot 90 includes a sealing surface 91 and a lip 92. The sealing surface 92 interfaces with the sealing surface 48 on the nozzle 40 to provide an acoustic seal between the boot 90 and the nozzle 40. Thus, when the driver 30, the boot 90 and the nozzle 40 are installed, the boot 90 is positioned between the nozzle 40 and the driver 30 in a compressed manner so as to ensure an acoustic seal between the sound port 35 and the nozzle 40. Additional details regarding how the interface between driver 30 and nozzle 40 can be configured will be discussed in further detail below.

To aid in the interface between the driver 30 and the nozzle 40, a threaded retainer 100 is provided. The threaded retainer 100 may be made of stainless steel or may be made of other suitable metals or plastics. The threaded retainer 100 includes a thread 103, a detent 105 and a lip 106. The lip 106 is configured to be inserted in the channel 13 of the case 10 during installation. The lip 106 includes a notch 107 on the top and a notch 108 on the bottom. These notches 107, 108 are configured to interface with the arms **82*a*, 82*b* of the support 80**.

The detent 105, also referred to as a keyway, is configured to accept the pin 43 of nozzle 40, thus detent 105 provides an example of an orientation member that prevents nozzle 40 from being installed in an improper orientation. By rotating threaded retainer 100 through 180 degrees, the earphone can be configured for either the right ear or the left ear. Thus, it becomes more cost effective to provide an earphone designed to fit each ear because there is no requirement for separate parts to make the earphone fit in both ears.

The thread 103 is configured to mate with a corresponding thread (not shown) on a nut 110. The nut 110 may be made of stainless steel or other suitable metals or plastics and, when tightened, can provide the compression force that ensures an acoustic seal between the driver 30 and the nozzle 40. As depicted, the nut 110, which is an example of a nozzle fastener, holds the nozzle in place. When the components are assembled and installed in between the case 10 and the cover 20, the thread 103 of the threaded retainer 100 will extend out so that the nut 110 can fasten to the thread 103. When the nut 110 is tightened, which may be done by hand, a force will be exerted on the friction edges 13 and friction edge 23 of the case 10 and cover 20, respectively. This force may have a tendency to push the case 10 and the cover 20 apart.

To help hold the case 10 and the cover 20 together, a ring 120 may be configured to be installed on the ring surface 22 and the ring surface 14 of the cover 20 and the case 10, respectively, when the cover 20 and case 10 are installed together. The ring 120 may be made of stainless steel or other suitable metals or plastics and may be made to have a slight interference fit with the ring surfaces 22, 14 of the cover 20 and the case 10 so as to help ensure the case 10 and cover 20 do not become unassembled during use. The ring 120 may also be deleted and the nut 110 or the case 10 and cover 20 may be modified accordingly.

It should be noted that while the nut 110 has certain benefits that will be discussed below, other types of fasteners, such as clips that include one or more fingers configured to releasably engage a crevice, may also be used.

Figure 3:
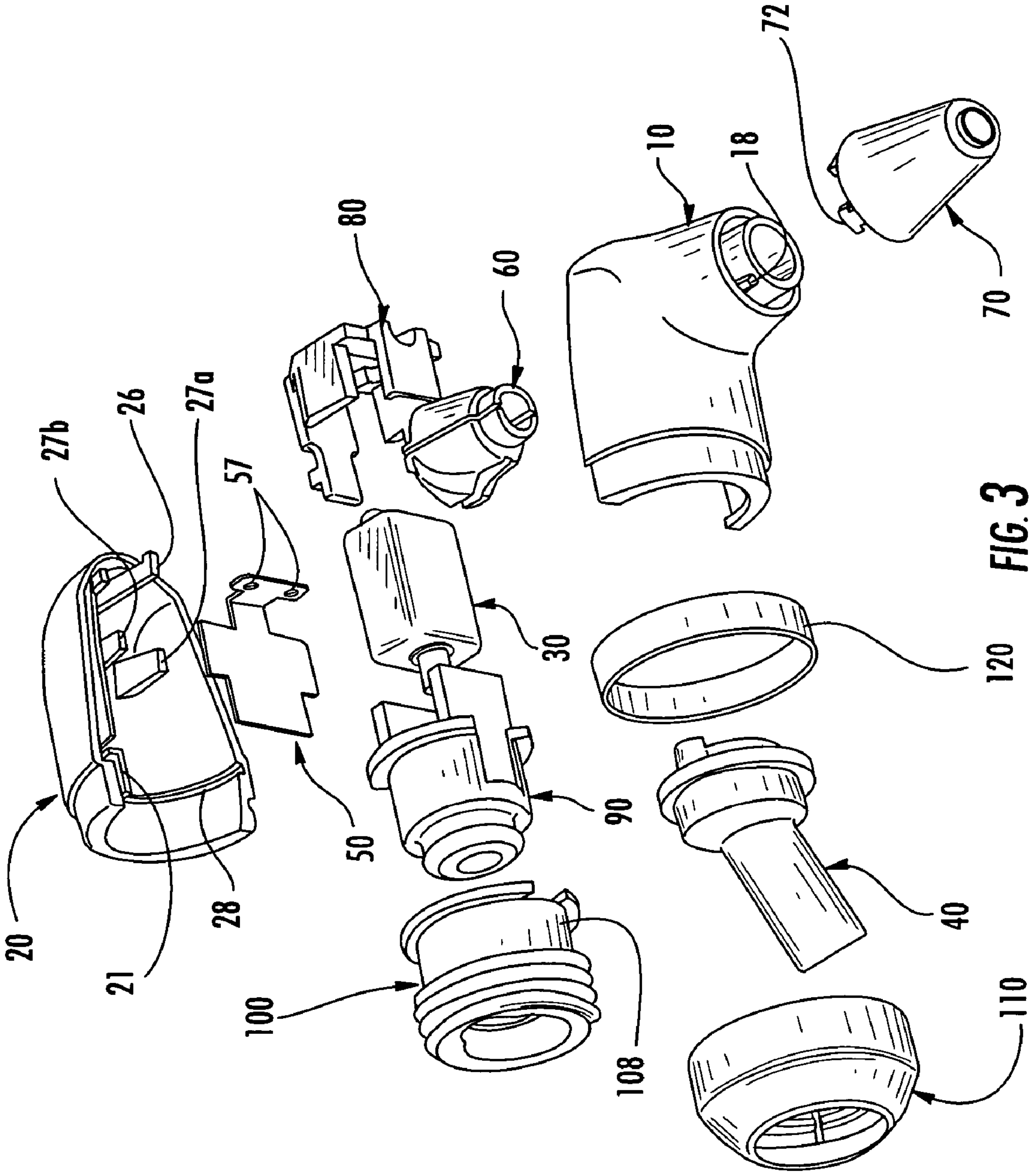
FIG. 3 depicts the exploded elevated view of the earphone depicted in FIG. 2 with the elevated view taken from a different angle in accordance with an aspect of the present invention.

Turning to FIG. 3, the exploded view of the components depicted in FIG. 2 is provided from a different angle so that additional details are visible. Looking first at the case 10, the pockets 18 are visible. As depicted and as discussed above, when the flex relief 70 is over-molded onto the case 10, the molding process forces some material into the pockets 18 and the cooling process creates the fingers 72 that hold the flex relief 70 in position.

Looking at the flex circuit 50, the solder apertures 57 are more clearly visible. In an embodiment, the flex circuit 50 is placed against the solder pads 37 and heat is applied so that the solder apertures 57 are soldered to the driver 30.

Turning next to the cover 20, a shoulder 21 is shown. The shoulder 21 interfaces with a shoulder 16 of the case 10 so as to aid in providing an acoustical seal between the internal components of the earphone 5 inside the housing 6 and the external world. A retaining finger 26 aids in holding the cover 20 to the case 10 by interfacing with the notch 15. A post 27*a* aids in supporting and positioning the support 80. Another post 27*b* is provided opposite post 27*a*, the post 27*b* also configured to support and position support 80. Thus, support 80 is supported and positioned, in part, by posts 12*a*, 12*b*, 27*a*, and 27*b*.

A channel 28 is also provided on cover 20 and corresponds with a channel 13 on the case 10 (FIG. 2). As depicted, the channel 28 and channel 13 are configured to accept the lip 106 of the threaded retainer 100. Thus, when the case 10 and cover 20 are mated together, the lip 106 is retained and the threaded element 100 is securely held in place. Additional details regarding the interface between the threaded element 100 and the case 10 are provided below.

Figure 4:
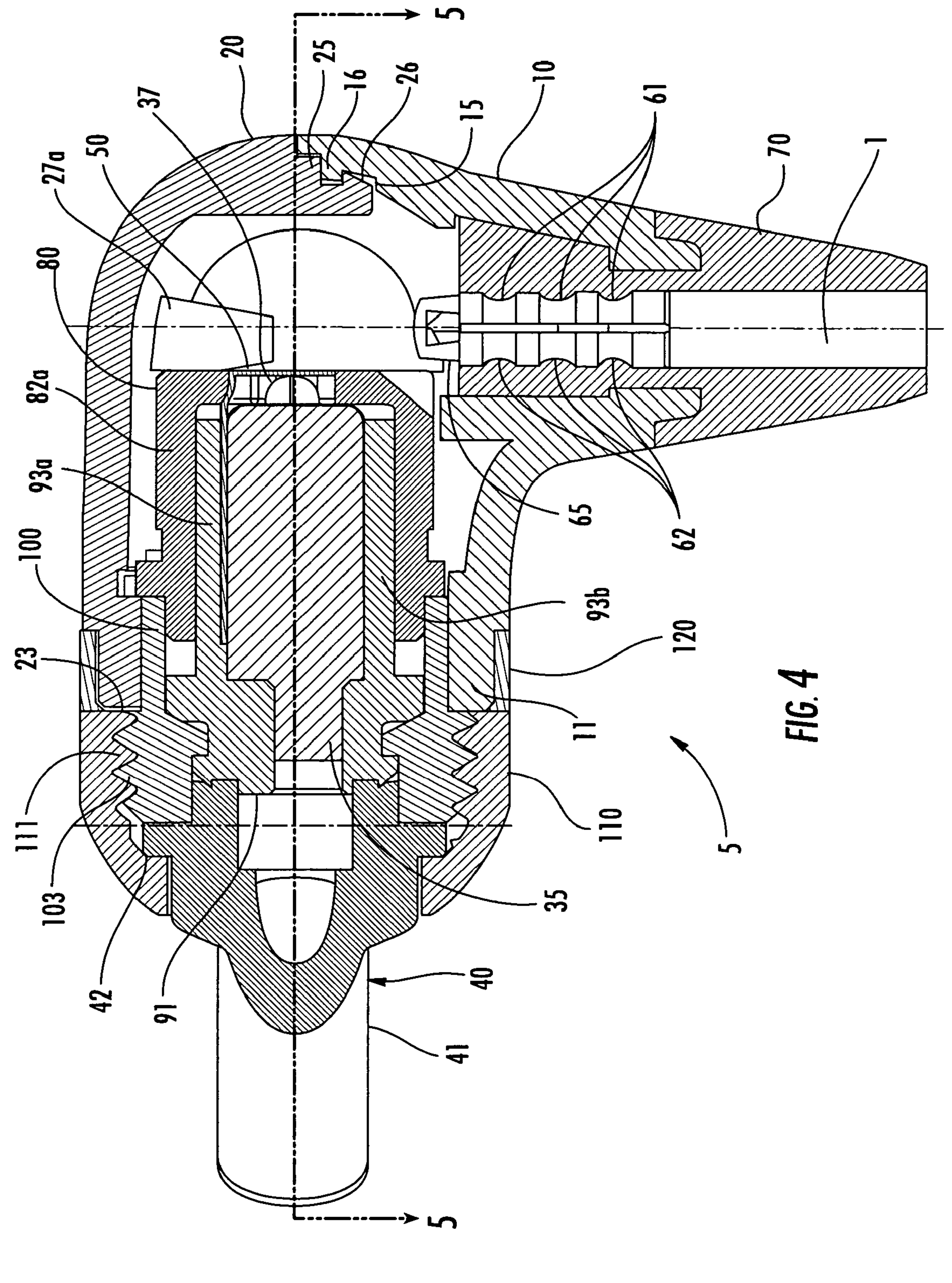
FIG. 4 depicts a cross-section of the earphone as depicted in FIG. 1, taken along the line 4-4 in accordance with an aspect of the present invention.

Turning now to FIG. 4, a cross sectional view along the line 4-4 of the earphone 5 depicted in FIG. 1 is provided. The case 10 is mated to the cover 20 by the interface between the shoulder 16 of the case 10 and the shoulder 21 of the cover 20. The retaining finger 26 is positioned in the notch 15 so as to prevent the cover 20 from becoming detached from the case 10, thus the rear portion of the earphone is securely joined.

As discussed above, to hold the other end of the earphone 5 together, the ring 120 may be installed on the ring surfaces of the case 10 and the cover 20. As depicted, the ring 120 is compressed between the nut 110, the shoulder 24 of the cover 20 and the shoulder 17 of the case 10.

Preferably, however, the ring 120 does not undergo significant compression when the nut 110 is tightened. In an embodiment, the nut 110 bottoms out on the friction edge 11 and 23 of the case 10 and cover 20, respectively, when tightened. This bottoming out of the nut 110 on the frictional edges 11, 23 allows for increased frictional resistance to vibration loosening so that vibrations occurring during regular use of the earphone 5 do not cause the nut 110 to loosen in an unacceptable manner. In another embodiment, the nut 110 can be further retained with the use of an o-ring placed on the threaded retainer 100. In such an embodiment, the o-ring may be placed in a groove formed in the threaded retainer 100 so that the o-ring is compressed when the nut 110 is installed and the compression of the o-ring can aid in preventing the loosening of the nut 110. As can be appreciated, other methods of vibration resistance may also be used. However, if the nut 110 is to be removed by hand it should not be secured too tightly.

As can be observed from FIG. 4, the nut 110 and the threaded retainer 100 hold the lip 42 of the nozzle 40 in place. The sealing surface 48 is thus placed in an interference fit condition with the sealing surface 91 of the boot 90. In should be noted that the sealing surface 91 of the boot 90 is depicted overlapping the sealing surface 48 of the nozzle 40. In practice, the sealing surface 91 of the boot 90, being the softer, more compressible material, is compressed between the internal flange 104 of the threaded retainer 100 and the sealing surface 48 of the nozzle 40. Thus, an acoustically tight seal may be provided between the boot 90 and the nozzle 40. The sound port 35 of the driver 30 may be inserted into the boot 90. In an embodiment, the fit between the sound port 35 of the driver 30 and the boot 90 may be a snug, acoustically tight interface. Thus, sound exiting the sound port 35 may be directed into the nozzle 40 and toward the user's ear.

As can be further observed from FIG. 4, the support 80 holds the driver 30 in position by supporting the wings 93*a* and 93*b* with the arms 82*a*, 82*b*. Thus, the driver 30 is protectively cushioned from vibration. In addition, the flex circuit 50 is shown in contact with the solder pads 37 and the post 27*a* is shown positioning the support 80.

Looking now at the strain relief 60, a plurality of ridges 61 and 62 are positioned across from each other. When the wire 1 is inserted into the passageway formed by the opposing ribs 61, 62, the opposing ribs 61 and 62 clamp onto the wire 1 and firmly hold it in place. This clamping is effective because the insulation of wire 1 is compressible. The opposing ribs 61, 62 may also be aligned so that the wire 1 followed an undulating path in a known manner. The undulating path may be more effective for certain types of wire insulators.

The living hinge 65 can also be observed in FIG. 4. The living hinge 65 holds the two sides of the strain relief 60 together at the top. The bottom of strain relief 60 is configured to be compressed together by the case 10 when the strain relief 60 is installed. As depicted, the case 10 is angled so that forces exerted on the wire 1 will cause the strain relief 60 to more tightly compress the wire 1. Thus, the insertion of the strain relief 60 into the case 10 causes the two sides of the strain relief 60 to be pressed together. As can be appreciated, when manufactured the two sides of the strain relief 60 are somewhat farther apart. The living hinge 65 allows the two sides to be brought together because in operation the living hinges 65 flexes as the sides are brought together. To be fully effective, the material used to manufacture the strain relief 60 should be strong enough to prevent deformation of the ribs 61, 62 when the wire 1 is compressed between the ribs. The material should also be flexible enough to prevent the living hinge 65 from cracking or otherwise effectively acting as a living hinge. In an embodiment, the material may be polypropylene. As living hinges are known, additional details are within the knowledge of one of ordinary skill in the art.

Figure 5:
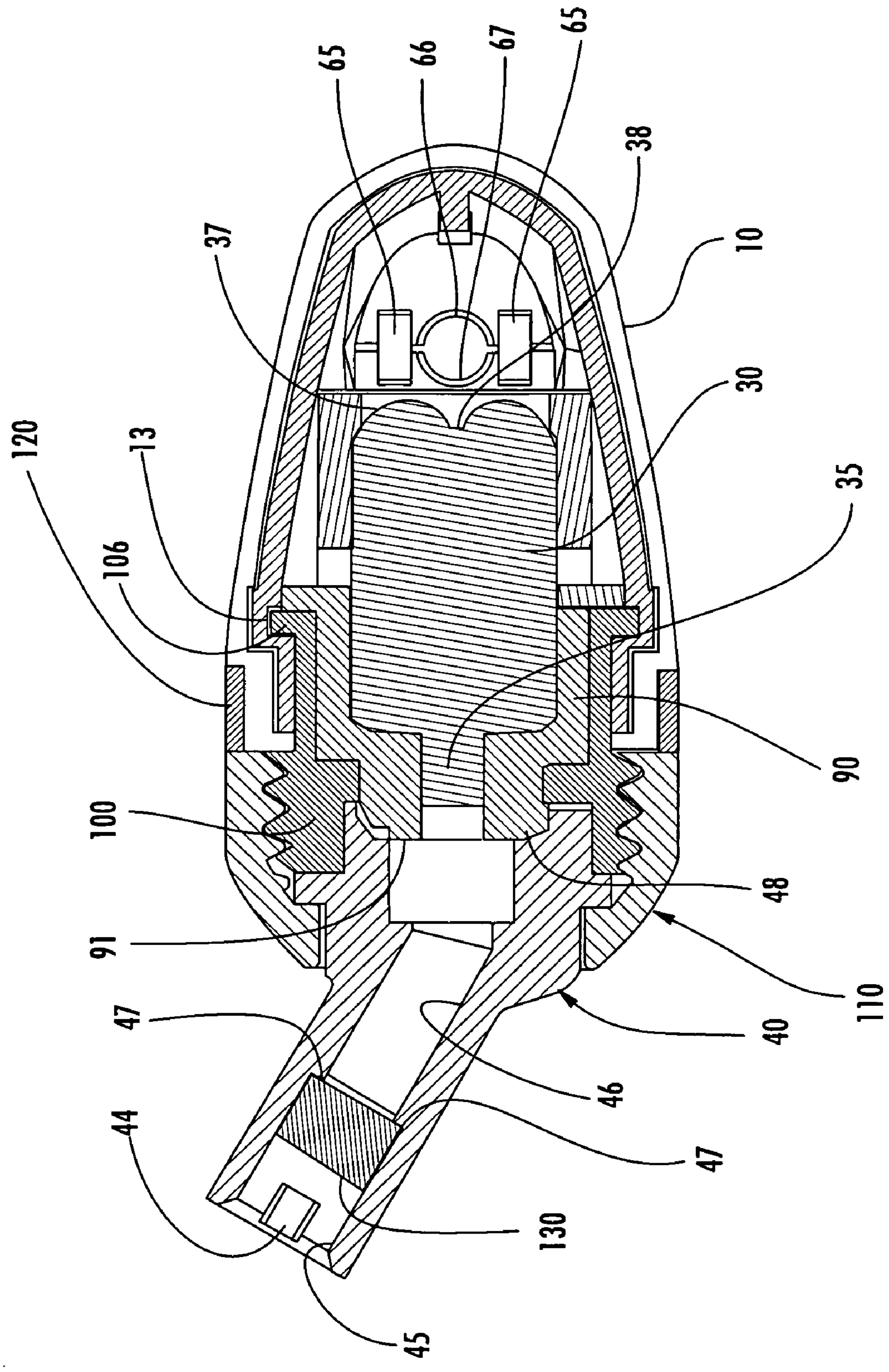
FIG. 5 depicts a cross section of the earphone depicted in FIG. 4, taken along the line 5-5 in accordance with an aspect of the present invention.

Turning next to FIG. 5, a cross-sectional view taken along the line 5-5 of FIG. 4 is provided. Living hinges 65 are visible on both sides of the passageway through the strain relief 60, the passageway being formed by a "C" section 66 and a "C" section 67 in the strain relief 60. The wire 1 is omitted for the safe of clarity.

The sound port 35 is depicted inserted into the boot 90 and the boot 90 is pressed against the nozzle 40. Thus, the sound port 35 is acoustically sealed to the nozzle 40. Therefore, sound exiting the sound port 35 enters the nozzle 40, travels through a cylinder 41, passes through an acoustic filter 130 and exits the earphone 5. Thus, it is the sound exiting the sound port 35 that the user may hear.

As can be appreciated, there is some empty space in the rear portion of the earphone 5 behind the driver 30. This space is acoustically sealed from the sound port 35, thus it potentially has value as an acoustic enclosure 140 for enhancing bass response. Therefore, in an embodiment, an acoustic opening may be provided in the driver 30. The acoustic opening, which will be referred to as acoustic port 38, may allow the driver 30 to provide improved lower frequency response via the sealed acoustic enclosure 140. The acoustic port 38 may be located between the two solder pads 37.

As is known, the volume of the acoustic enclosure (i.e. the enclosure volume) has the greatest positive effect on bass enhancement if limited to a certain range. If the volume of the acoustic enclosure 140 is too small, the beneficial effect the enclosure has on the lowest frequencies will be diminished. An overly large acoustic enclosure 140 provides little or no benefit and increases space requirements. Thus, it is preferable, but not necessary, to keep the acoustic enclosure volume in a range of 1 to 2 times the volume of the driver 30, more preferably at about 1.5 times the volume of the driver. Accordingly, while an acoustic enclosure volume outside the preferred volume may have some effect on bass response; better results are typically observed when the acoustic enclosure's volume is kept to the range provided.

Turning now to the nozzle 40, as discussed above, the sound port 35 is acoustically sealed to the sealing surface 48 of the nozzle 40 via the boot 90. Sound enters the nozzle 40 and passes through the cylinder 41. The cylinder 41 has a first inner passageway 46 that has a first inner diameter. The cylinder 41 has a second inner passageway 45 that has a second, large inner diameter. Shoulder 47 joins these two passageways. The acoustic filter 130 is mounted inside passageway 45 and is pressed up against shoulder 47.

The acoustic filter 130 protects the internal components of earphone 5 from sweat and other body fluids such as liquid ear wax that might otherwise enter and damage the driver 30. The acoustic filter 130 also provides a desired impact on the tonal qualities of the music being reproduced by the driver 30. For example, the acoustic resistance of the acoustic filter 130 may configured to cause the reproduced sound to be brighter or warmer. This can help configure the earphone 5 so that it provides the desired warmth and brightness for a given driver 30.

While music taste accounts for some of the desire for warmer or brighter sound, the desire for a warmer or brighter sound can also depend on the individual's hearing because a person with a decreased ability to hear higher frequency sounds would naturally require a brighter sound in order to experience a "normal" music experience. Furthermore, some types of music and some recordings sound better when reproduced on a system with either a warmer or brighter bias.

To control the warmth or brightness of the sound, the filter 130 that is provided includes a predetermined amount of acoustic resistance. Thus, in an embodiment, the earphone 5 may include a nozzle with a first filter that provides a bias towards a brighter sound, the first filter having a relatively lower acoustic resistance. In another embodiment, the earphone 5 may include a nozzle with a second filter that provides a bias towards a less bright sound, the second filter have a relatively higher acoustic resistance. In an embodiment, two nozzles 40 with different acoustic filters 130 having different acoustic resistance may be provided together so that the user can determine which bias is preferable. In another embodiment, a nozzle 40 configured for the left ear and a nozzle 40 configured for the right ear may be provided together in a kit, the two nozzles 40 including filters 130 configured to provide a predetermined acoustic resistance. The kit may be used to replace existing nozzles 40 and may also be used to vary the sound of the earphone 5.

To install the acoustic filter 130 in the nozzle 40, two grooves 44 on passageway 45 are provided. The filter can be installed according to the teaching provided in U.S. Pat. No. 6,772,854, which is incorporated herein by reference in its entirety.

Regardless of the acoustic resistance of acoustic filter 130 used in the nozzle 40; the acoustic filter 130 is likely to become dirty over time, thus decreasing the performance of the earphone 5. In an embodiment, the user can readily replace the nozzle 40 without the need for complicated tools. First, the user may remove nut 110. Care should be taken so that the nut 110 is not scored when being removed, thus it is preferable to remove the nut 110 by hand. Once the nut 110 is removed, the nozzle 40 can be removed. A new nozzle 40 can then be installed and the nut 110 can be reinstalled and tightened. The pin 43 of the nozzle 40 and the corresponding detent 105 of threaded retainer 100 ensures that the nozzle 40 is installed in the correct orientation. Thus, once the new nozzle 40 is installed, the nut 110 can be hand tightened and the earphone maintenance will be complete. Thus, it is possible to replace the acoustic filter 130 relatively quickly without the need for complicated removal steps and/or special tools. In the event that a new nozzle 40 is not available, the dirty nozzle 40 can be cleaned by methods not suitable for cleaning the entire earphone assembly. For example, the nozzle 40 may be removed and soaked in bath of hot water at about 140 degrees Fahrenheit. Numerous other solutions, such as alcohol, may also be used to soak the nozzle 40 and the filter 130. After soaking the nozzle 40, an application of compressed air may be used to blow out any loosened particles. The nozzle 40 may then be reinstalled as discussed above.

In an alternative embodiment, the orientation of nozzle 40 may be adjustable. In an embodiment, the nozzle 40 can be provided without an orientation pin but instead provide visual clues to give the user an understanding as to the planned position while allowing the user to customize the nozzle orientation according to the user's preferences and ear shape. In addition, the threaded retainer 100 can also include a plurality of detents so that pin can be inserted in multiple orientations that have minor variations in rotational angle. In an alternative embodiment, nozzles 4 with variable cylinder angles may be provided so that the user could more completely customize the fit of the earphone 5 to the user's anatomy.

In addition, the nozzle 40 may be configured to be rotatable. For instance, the nozzle 40 could be a two piece system having a compressible seal between the two pieces. Thus, when the nut 110 was loosened the orientation could be modified and when the nut 110 was tightened the nozzle 40 would again provide an acoustically sealed path from the sound port 35 of the driver 30 to the user's ear.

Turning now to FIGS. 6-15, additional details regarding how the various components interface have been provided. In addition, as the components are depicted in somewhat larger scale, additional features are more readily appreciated. It is noted that illustrations discussed below are merely representative of exemplary embodiments and other designs and configurations are feasible.

Figure 6:
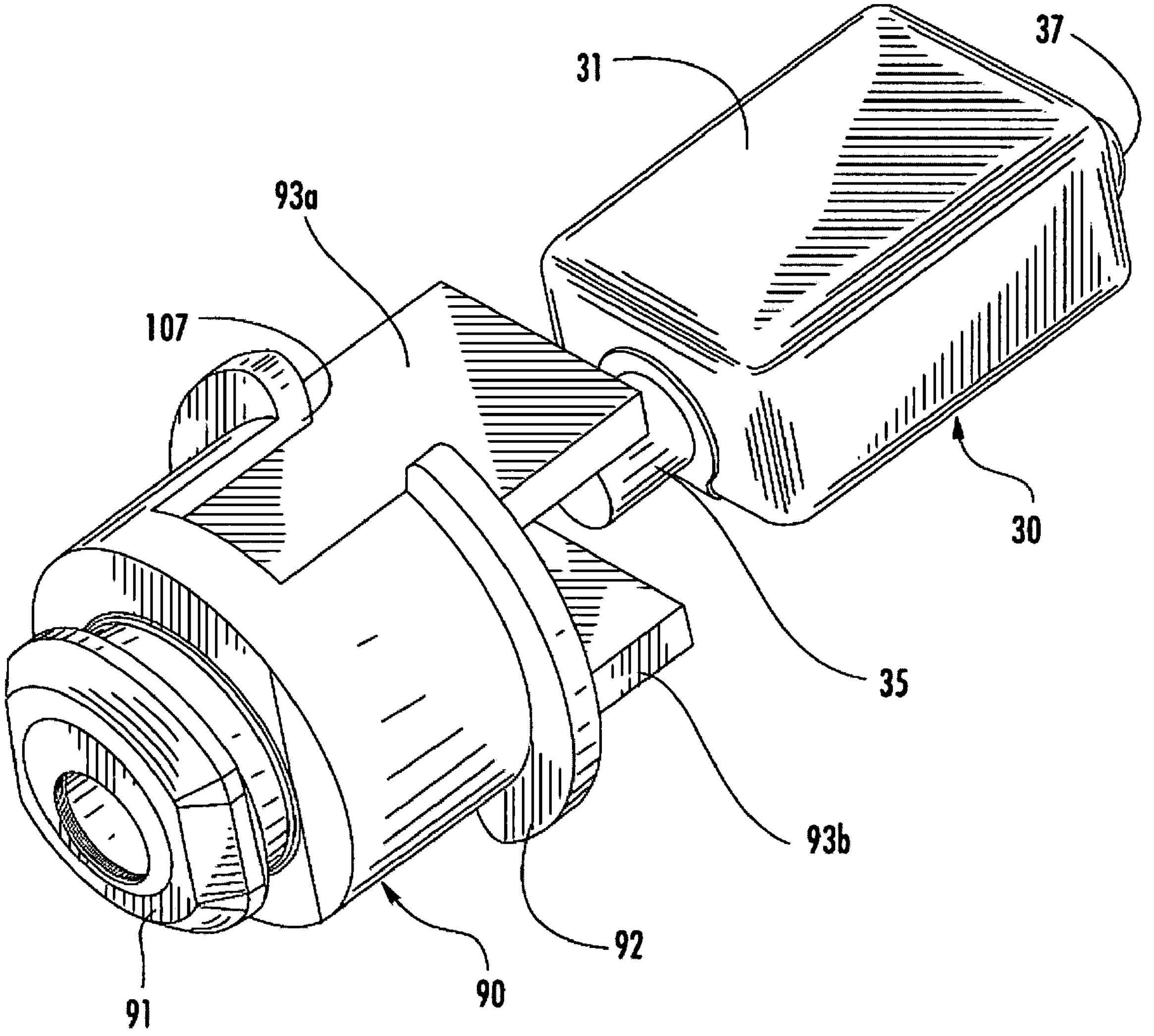
FIG. 6 depicts an exploded elevated view of an embodiment of a driver and a boot in accordance with an aspect of the present invention.

Looking at FIG. 6, a close-up of an embodiment of driver 30 and boot 90 is provided that more clearly shows some of the features of boot 90. In an embodiment, the body 31 may be slightly thicker than the space between the wings 93*a*, 93*b*. Thus, the boot 90 can stretch slightly when being installed on the driver 30. As can be appreciated, the interference fit is useful in preventing unwanted vibrations and unwanted rattles. In an embodiment the interference fit may be 0.001 inches.

As can be appreciated from FIG. 6, the sound port 35 of the driver 30 is placed into the boot cylinder 95 so that the driver 30 may be acoustically sealed to the boot 90. The notch 97 in the tab 92 will be discussed in greater detail below.

Figure 7:
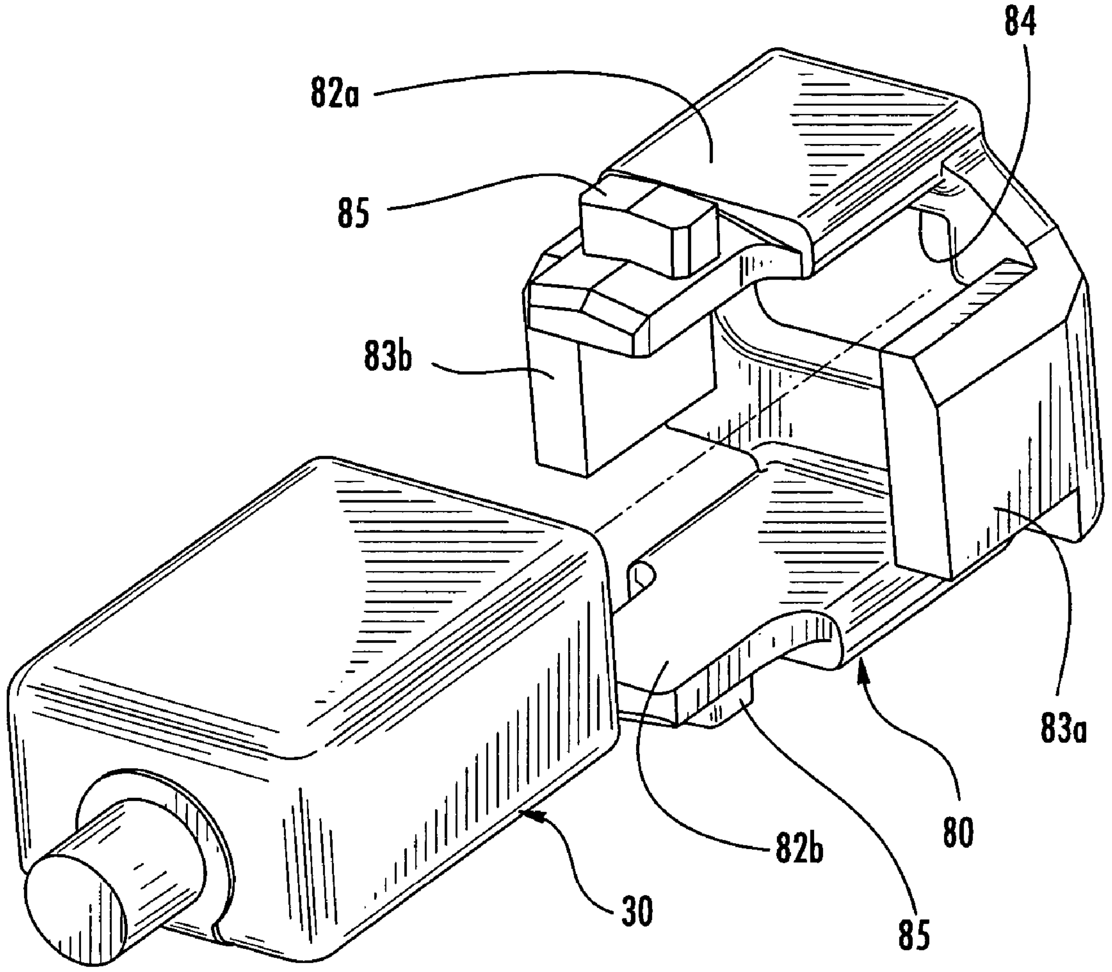
FIG. 7 depicts an exploded elevated view of an embodiment of a driver and a support in accordance with an aspect of the present invention.

FIG. 7 depicts an embodiment of the driver 30 and the support 80. As depicted, the support 80 does not directly contact the top and bottom surfaces of the driver 30 but instead supports the driver 30 via the boot 90 (FIG. 6). As the support 80 is preferably made of a hard plastic, the vibration isolation that can be provided by the boot 90 is useful in preventing unwanted vibrations from affecting the sound produced by driver 30. In addition, as noted above, the boot 90 helps protect the driver 30 from impact. In addition to the arms 82*a*, 82*b*, the support also includes legs 83*a*, 83*b*. A hole 84 is provided in the support 80 so as to allow sound exiting from the acoustic port 38 to readily enter the acoustic enclosure 140 (FIG. 4-5). A block 85 may be provided on the arms 82*a*, 82*b*, the use of which will be discussed below.

Figure 8:
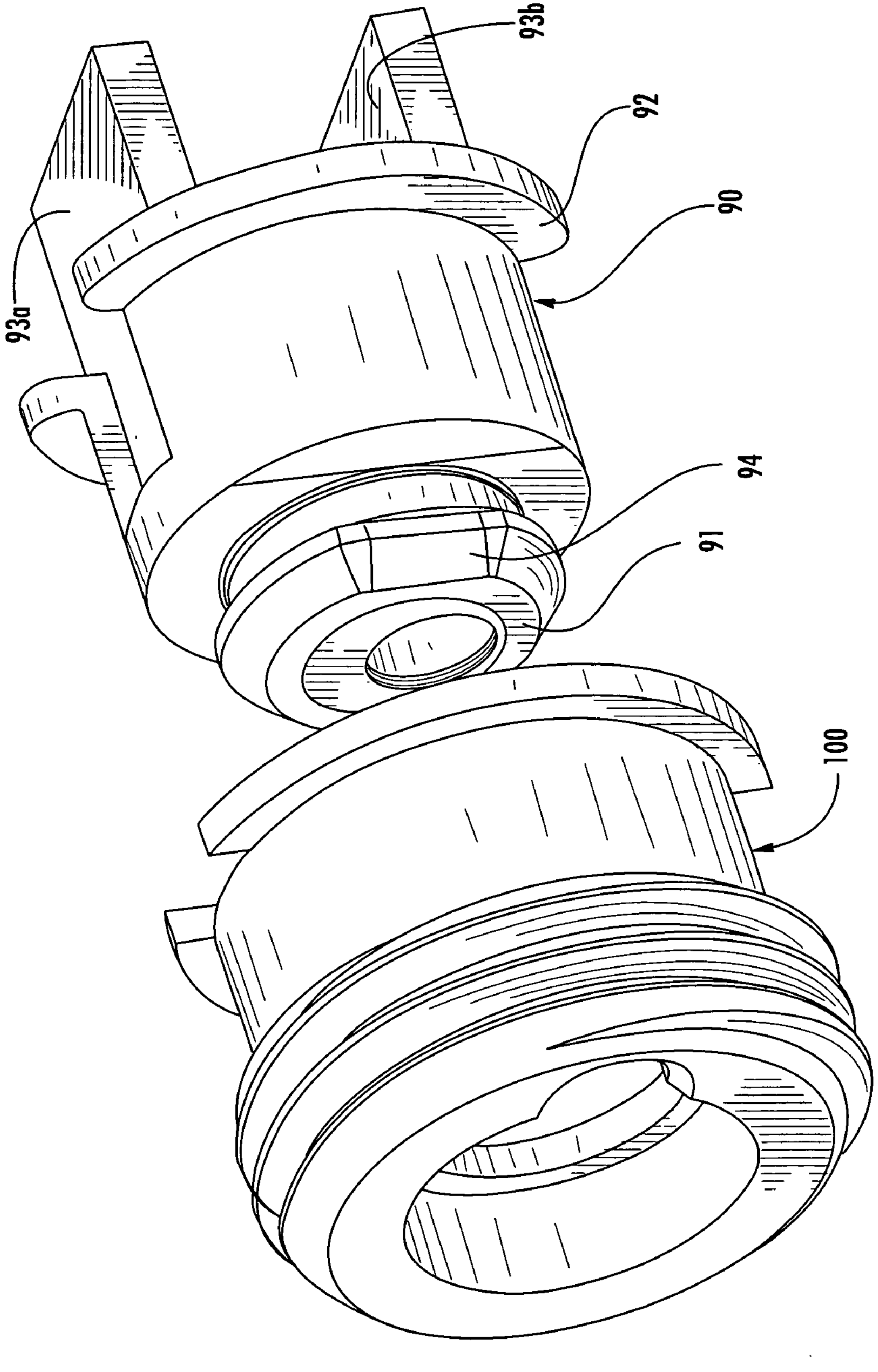
FIG. 8 depicts an exploded elevated view of an embodiment of a boot and a threaded retainer in accordance with an aspect of the present invention.

FIG. 8 depicts an exploded view of the threaded retainer 100 and the boot 90. As depicted, when the threaded retainer 100 and the boot 90 are installed, the notch 97 in the tab 92 lines up with the notch 107 in the tab 106. The boot 90 and threaded retainer 100 can then be assembled with other components of the earphone 5 a manner that will be discussed below.

Figure 9:
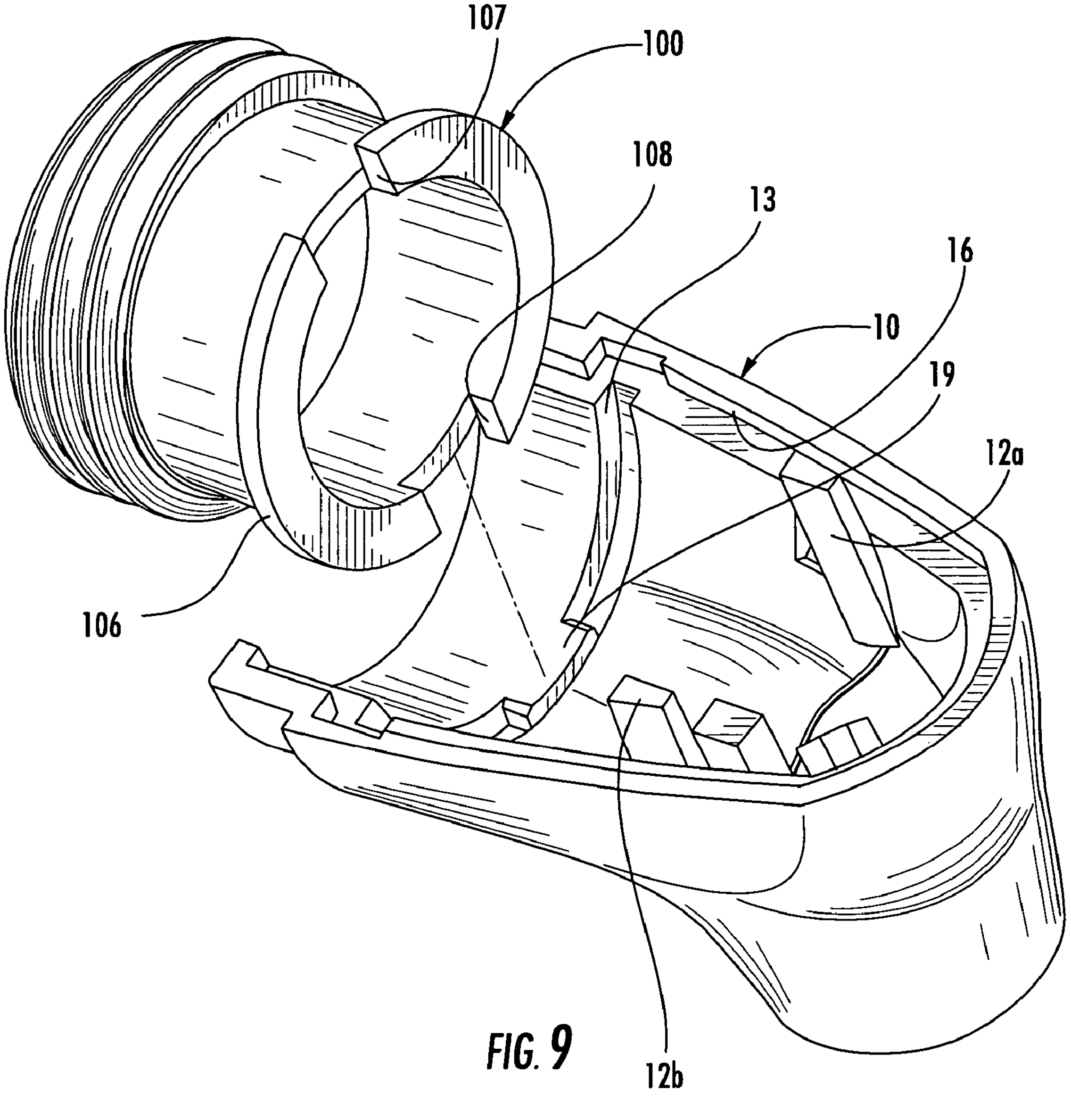
FIG. 9 depicts an exploded elevated view of an embodiment of a case and a threaded retainer in accordance with an aspect of the present invention.

FIG. 9 depicts an exploded view of the threaded retainer 100 and the case 10. As can be appreciated from FIG. 9, the lip 106 is configured to be inserted in the channel 13. To control the orientation, an abutment 19 may be provided in the channel 13. The abutment 19 may be configured to interface with the notch 108 in the lip 106. A similar abutment may be provided in the channel 28 of the cover 20 (not shown). As can be appreciated, the abutment 19 prevents the threaded retainer 100 from rotating in the channel 13 and also helps insure the threaded retainer 100 is properly orientated when installed in the case 10.

Figure 10:
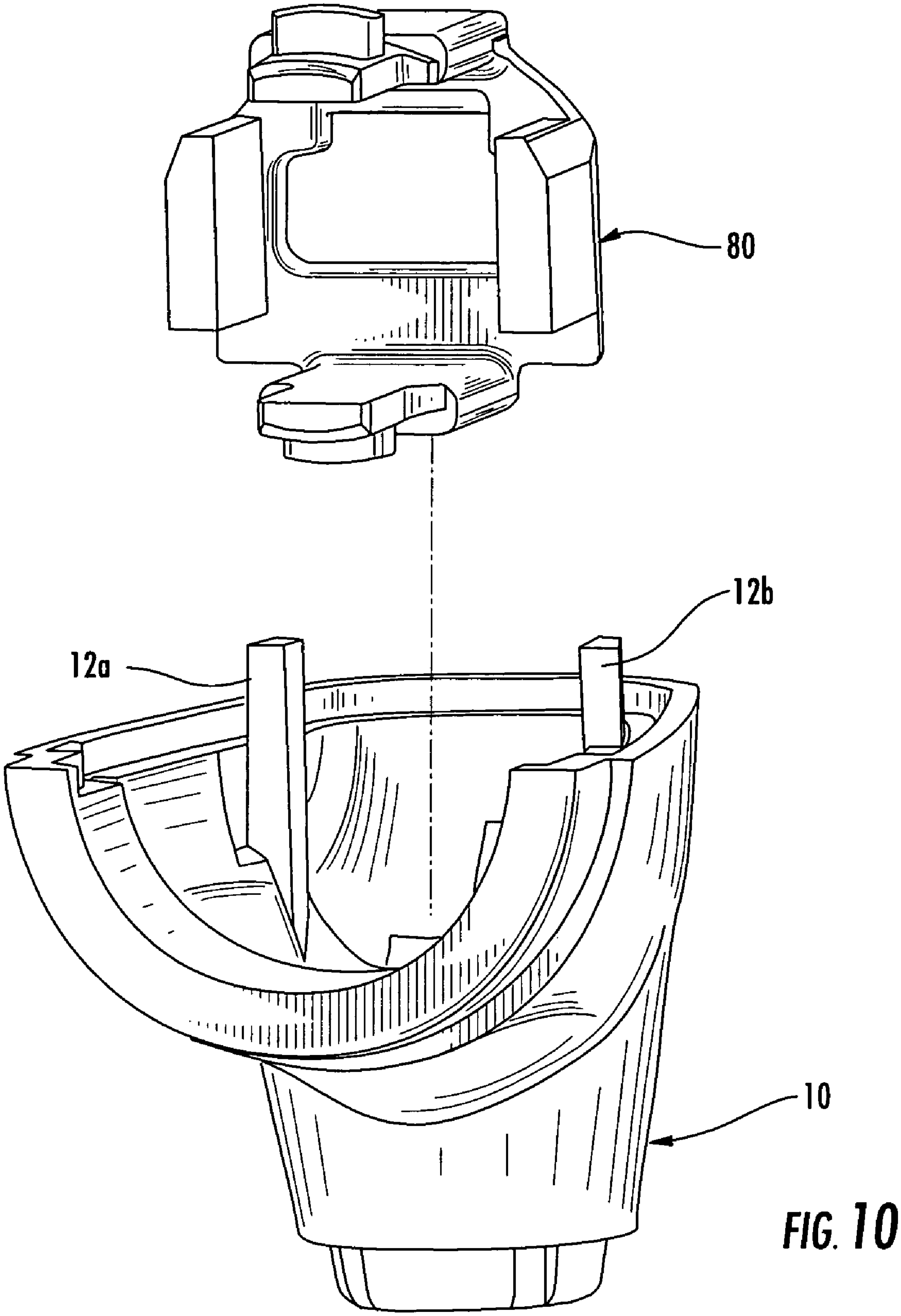
FIG. 10 depicts an exploded elevated view of an embodiment of a support and a case in accordance with an aspect of the present invention.

Turning to FIG. 10, an exploded view of the support 80 and the case 10 is illustrated. During assembly, the support 80 is placed into the case 10 and the support 80 is positioned and supported by the posts 12*a*, 12*b*. As can be appreciated, the driver 30 and boot 90 (not shown) are assembled with the support 80 before the support 80 is installed on the case 10. In an embodiment, the case 10 may be configured to aid in controlling the position of the support 80 when the support 80 is installed. The cover 20 (FIG. 3) may be configured to further control the position of the support 80.

Figure 11:
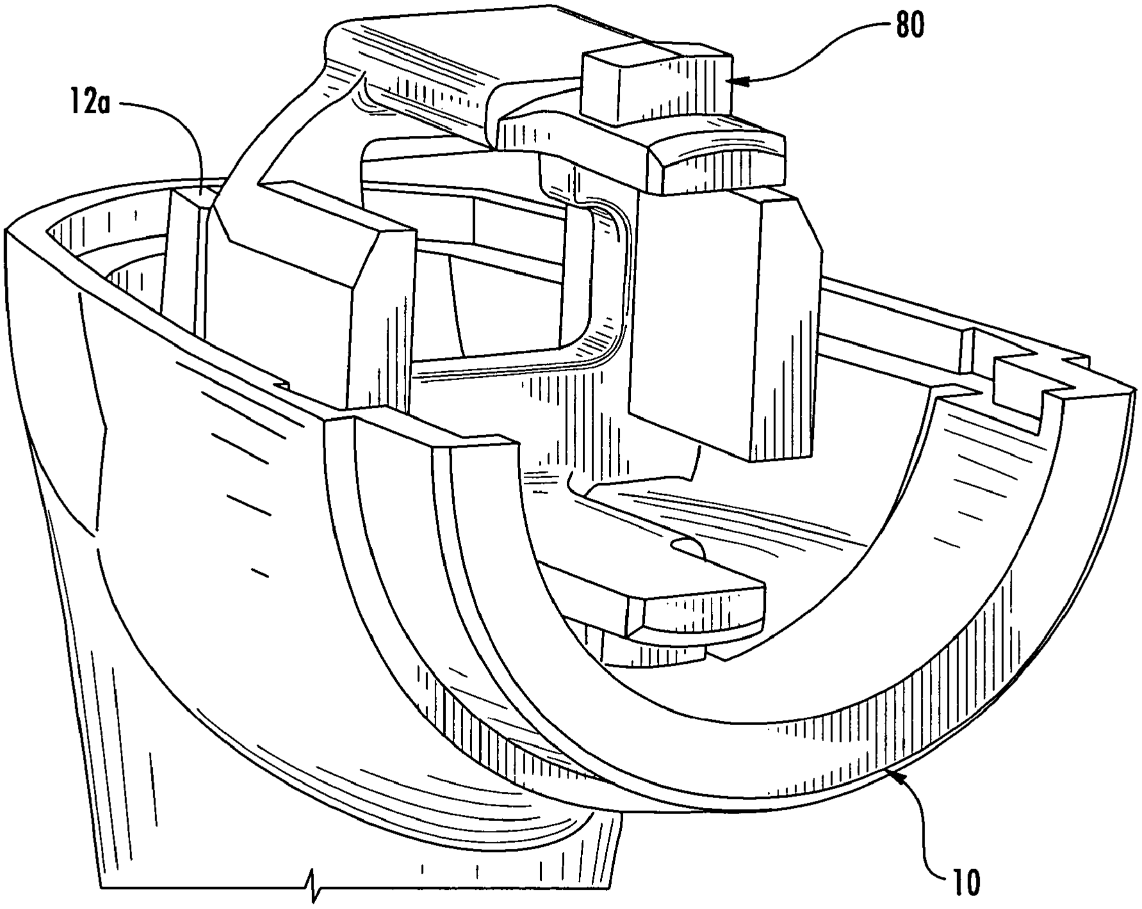
FIG. 11 depicts an elevated view of the support and case in FIG. 10 with the support assembled with the case in accordance with an aspect of the present invention.

Turning to FIG. 11, the support 80 is shown installed in the case 10. For the sake of clarity, other components, such as the driver 30, are not shown. As can be appreciated, the post 12*a* is configured to be behind the support 80 and aids in positioning the support 80. It should be noted that the support 80 is used to simplify the assembly process of the earphone 5 and, therefore, is not required. However, the cost of the support 80 may be less than the resultant improvement in the ease of assembly and the overall quality of the earphone 5 with the support 80 being used, thus suggesting the use of the support 80 may actually reduce the total cost.

Figure 12:
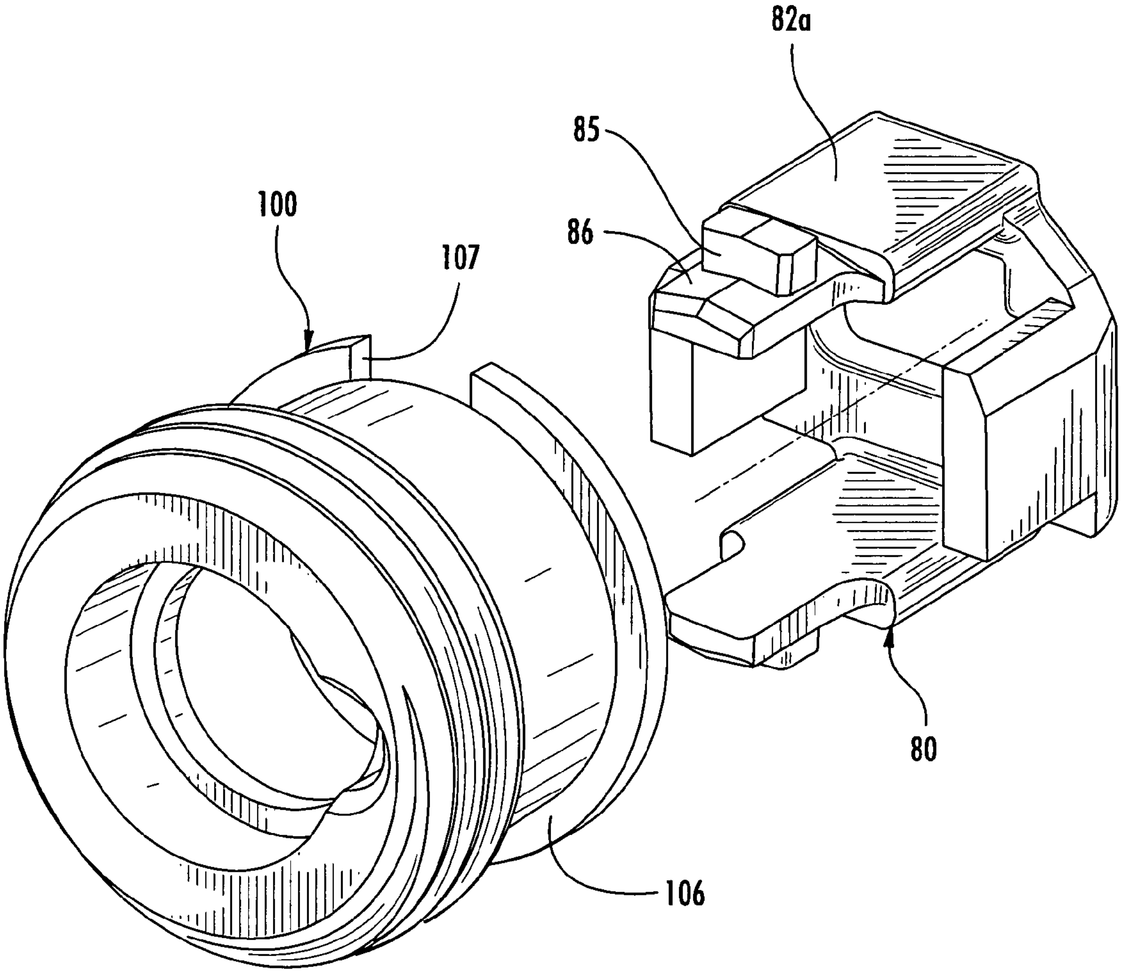
FIG. 12 depicts an exploded elevated view of an embodiment of a threaded retainer and a support in accordance with an aspect of the present invention.
Figure 13:
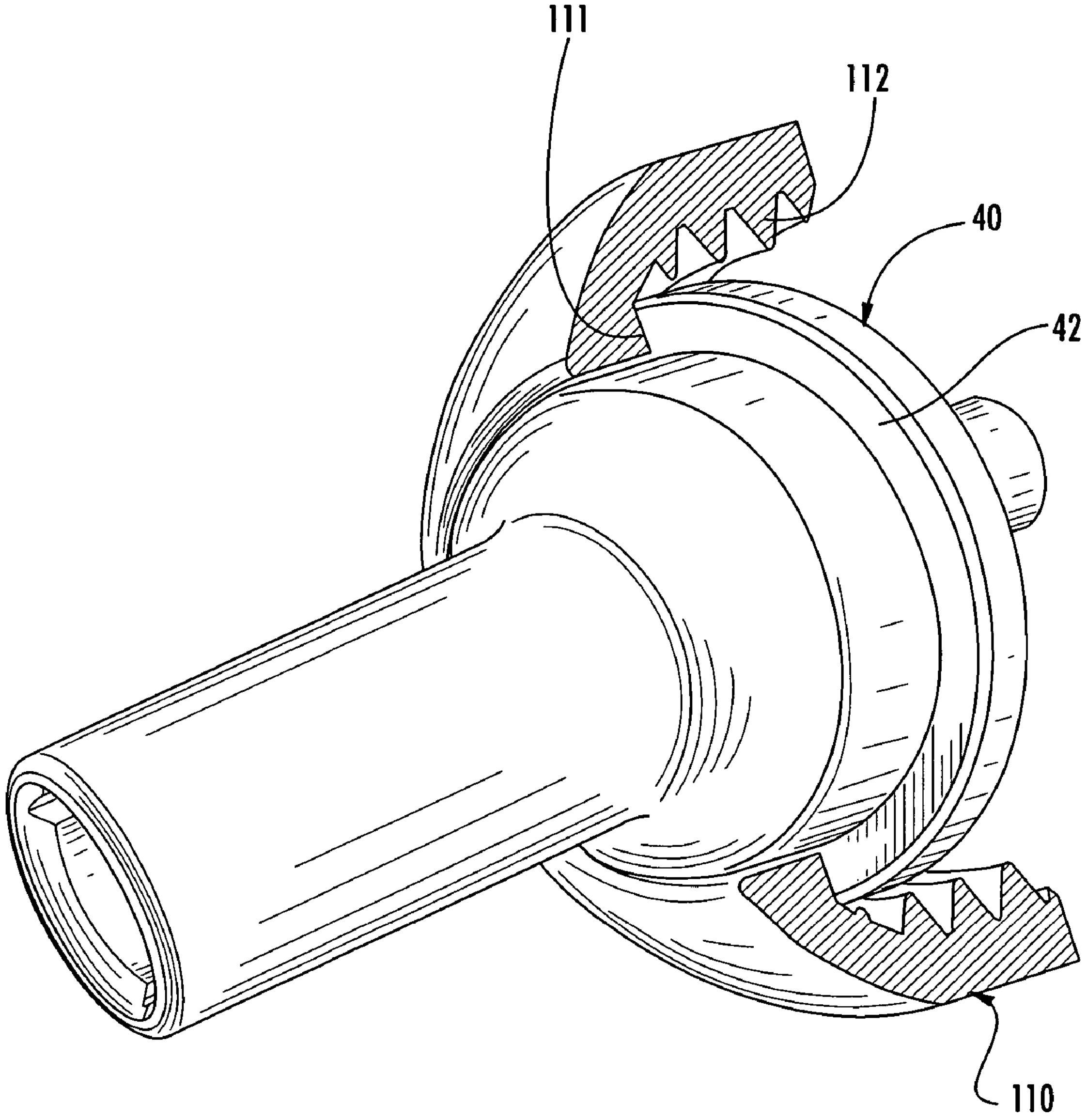
FIG. 13 depicts an elevated cutaway view of an embodiment of an interface between a nut and a nozzle in accordance with an aspect of the present invention.

Turning to FIG. 12, an exploded view of the support 80 and the threaded retainer 100 is illustrated. Prior to installing the support 80 to the threaded retainer 100, the driver 30 and the boot 90 would first be installed on the support 80. The support 80 would be then be inserted into the threaded retainer 100. In an embodiment, the projection 86 of the arm 82*a* is inserted into the threaded retainer 100 so that the block 85 interfaces with the notch 107. In this manner the relative orientation of the support 80 and the threaded retainer 100 may be controlled. The threaded retainer 100 includes the detent 105 that is configured to interface with the pin 43 of the nozzle 40 (FIG. 13). Thus, the orientation of the nozzle 40 may be controlled with respect to the support 80. As the support 80 is configured to be inserted into the case 10 in a particular orientation, the orientation of the nozzle 40 with respect to the case 10 may also be controlled. As previously discussed, however, by rotating the threaded retainer 100 through 180 degrees, the orientation of the nozzle 40 can be changed. Thus, in an embodiment, the same components may be used for both the left and right ear simply by changing the orientation of the threaded retainer 100.

FIG. 13 illustrates a cut-away view of the nut 110 and the nozzle 40 installed together. The nut 110 includes a clamping surface 111 that, in operation, is configured to act on the lip 42 so as to hold the nozzle 40 in position. If the nozzle 40 is acoustically sealed to the sound port 35 (FIG. 5) then the clamping surface 111 does not have to provide an acoustic seal between the nut 110 and the nozzle 40. However, to improve performance of the acoustic enclosure 140 it may be desirable to obtain such a seal. In an embodiment, the acoustic seal may be provided by providing a sealing material on the clamping surface 111, by sufficiently tightening of the nut 110 or by ensuring that the clamping surface 111 and the lip 42 are sufficiently smooth.

Figure 14:
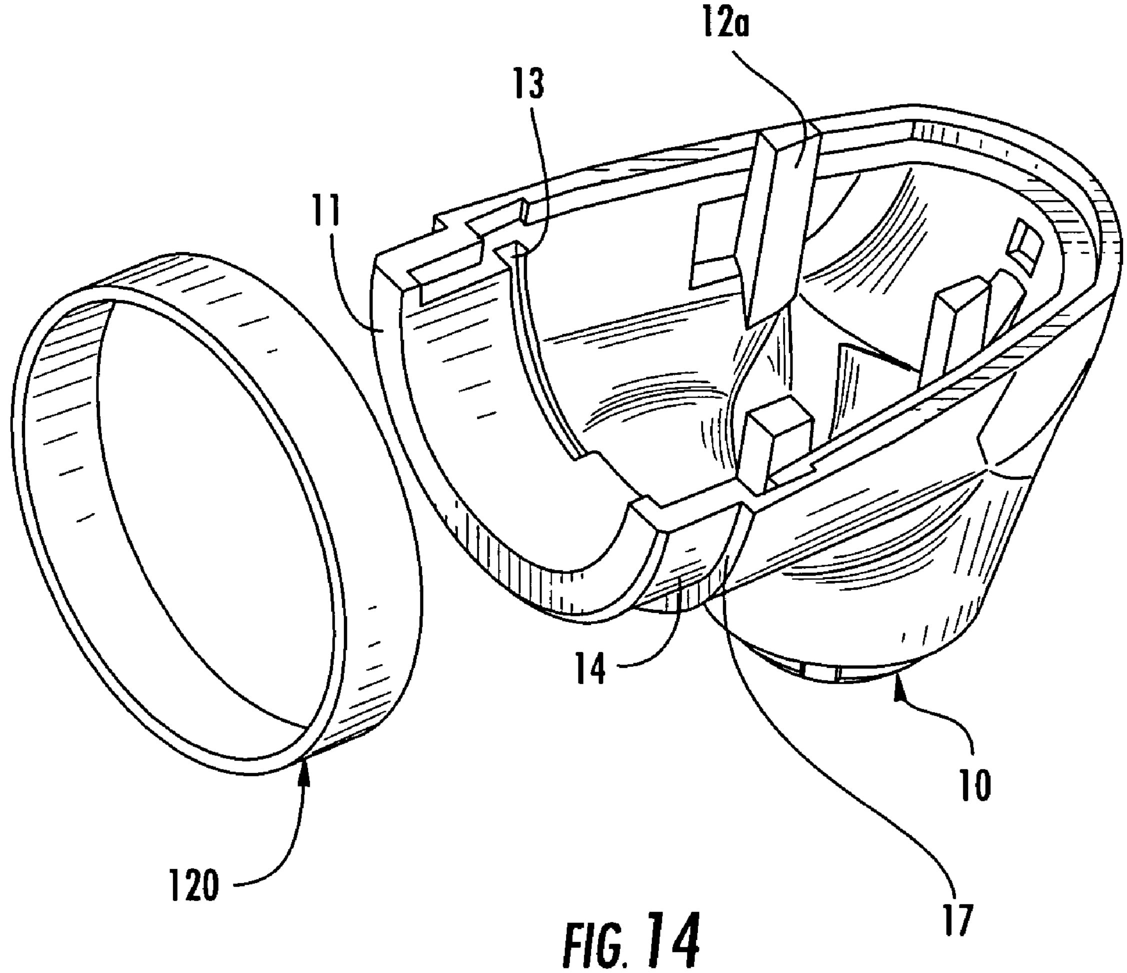
FIG. 14 depicts an exploded elevated view of an embodiment of a ring and a case in accordance with an aspect of the present invention.

FIG. 14 depicts a close-up embodiment of the ring 120 and the case 10. The ring 120 is configured to install over the case 10 (and cover 20—not shown) to hold the case 10 and the cover 20 together. An inner diameter of the ring 120 may be configured to be about the same size as an outer diameter of the ring surface 14 so that there is an interference fit when the nut 110 is attached to the threaded retainer 100. For example, in an embodiment the ring 120 may be about 0.069 inches wide with an inner diameter of 0.345 inches while the case 10 and cover 20 may form a surface with a width of about 0.069 inches and an outer diameter of 0.343 inches. In such an embodiment the stack-up of dimensional tolerances may cause a slight interference fit.

Figure 15:
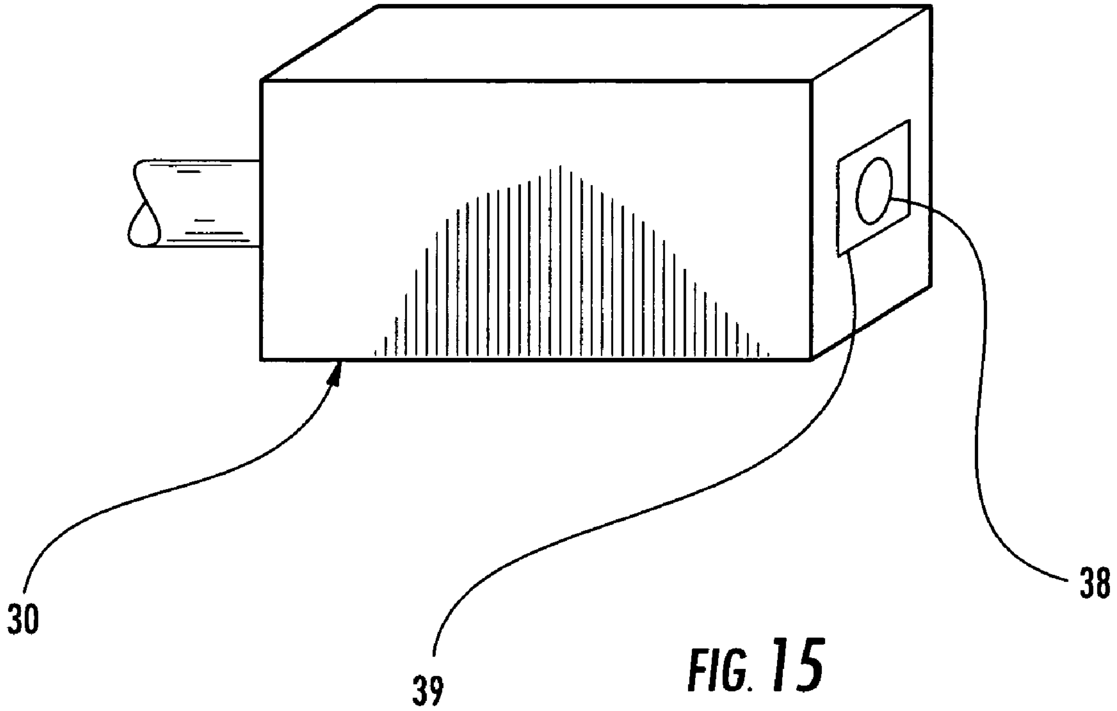
FIG. 15 depicts an elevated view of an exemplary embodiment of a driver in accordance with an aspect of the present invention.

Turning to FIG. 15, an embodiment of the driver 30 is depicted with the solder pads 37 omitted. The driver 30 includes the acoustic port 38 that is covered by a debris filter 39. If the acoustic port 38 is provided, the debris filter 39 can also be provided and may be used to prevent the passage of contaminants and unwanted materials in the acoustic enclosure 140 (FIGS. 4-5) from entering the driver 30 and potentially damaging the driver 30. While the acoustic port 38 may be located in other locations, an advantage of the location opposite the sound port 35 is that it is somewhat easier to provide an enclosure volume. In an embodiment the debris filter 39 will have little or no appreciable acoustic resistance. In an alternative embodiment, the debris filter 39, which may be a hydrophobic material, may have an appreciable acoustic resistance. The acoustic resistance can have the function of effectively reducing the enclosure volume and therefore may be useful in modifying the frequency response of the driver, as perceived by the user. The ability to vary the acoustic resistance of the debris filter 39 may also be useful in accounting for a change in the volume of the driver 30 or a change in the volume of the acoustic enclosure 140.

The present invention has been described in terms of preferred and exemplary embodiments thereof. Numerous other embodiments, modifications and variations within the scope and spirit described invention will occur to persons of ordinary skill in the art from a review of this disclosure.

We claim:

1. An earphone for sound reproduction, comprising:

a housing;

a driver mounted within the housing, the driver including a sound port, the driver having a volume;

a threaded retainer mounted to the housing;

a nozzle removably mounted to the housing, the nozzle including an acoustic filter, the nozzle being in acoustic communication with the sound port; and a removable nut configured to mate with the threaded retainer and to hold the nozzle in position.

2. The earphone of claim 1, wherein the acoustic filter provides sufficient acoustic resistance so as to cause earphone to sound less bright.

3. The earphone of claim 1, further comprising a boot mounted to the driver, the boot configured to acoustically seal the sound port to the nozzle.

4. The earphone of claim 3, wherein the earphone further comprises an acoustic enclosure and the driver comprises an acoustic port, wherein the acoustic port is in acoustic communication with the acoustic enclosure, the acoustic enclosure having a volume about 1 to 2 times the volume of the driver.

5. The earphone of claim 4, wherein the enclosure volume is about 1.5 times the volume of the driver.

6. The earphone of claim 1, wherein the threaded retainer includes a detent and the nozzle includes a pin, the pin configured to interface with the detent, whereby the orientation of the nozzle is controlled.

7. The earphone of claim 1, wherein a tonal quality of the earphone is adjustable by mounting a different nozzle.

8. The earphone of claim 7, wherein the tonal quality is adjusted by switching between nozzles having different acoustical resistances.

* * * * *

UNITED STATES PATENT AND TRADEMARK OFFICE

CERTIFICATE OF CORRECTION

PATENT NO. : 7,616,772 B2
APPLICATION NO. : 11/268873
DATED : November 10, 2009
INVENTOR(S) : Sabick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Nineteenth Day of October, 2010

David J. Kappos
*Director of the United States Patent and Trademark Office*